Patented Aug. 8, 1944

2,355,463

UNITED STATES PATENT OFFICE 2,355,463

PROCESS FOR MAKING SOLUBLE STARCH

Walter A. Nivling, Newton, Mass.; Lyman E. Nivling and Owen C. Nivling, administrators of said Walter A. Nivling, deceased No Drawing. Application May 19, 1941,
Serial No. 394,096

12 Claims. (Cl. 127—33)

This invention relates to a process for making soluble starch.

For many industrial uses it is necessary to modify the character of starch so that when heated to 140° F. or above with from one to three parts of water, it will dissolve to form a free-flowing liquid which will remain free-flowing when cooled. Starch so modified is generally referred to as "soluble" starch.

Various methods of modifying starches to make their solutions more free-flowing have been proposed. The present method involves treatment of the starch with an oxidizing agent and results in the production of what is known as an oxidized starch.

It is an object of my invention to provide improvements in processes for the manufacture of soluble starch and particularly in the production of an oxidized starch conversion product.

Numerous advantages, for example in control of the speed and extent of the reaction and in ease of carrying out the process, are obtained by my novel method. The soluble starch obtained by my process contains no dextrine or dextrose. Freedom from substantial amounts of dextrine or dextrose assures that, after driving off the water from an aqueous starch solution, the resulting film will not become tacky upon exposure to atmospheric moisture.

The practice of my invention involves a pre-treatment of the starch or starchy material with a view to rendering constituent particles thereof, at least superficially and temporarily, measurably water resistant. After such pre-treatment, an aqueous oxidizing agent is brought into contact with the starchy material. The oxidizing agent, for example in the form of an aqueous solution, may be added rapidly and may be brought into intimate admixture with the starch by agitation.

For example, in one treatment falling within the scope of my invention, a water immiscible or water-repellent retardant to oxidation is added to the starchy material. Petroleum ethers constitute a preferred class of such retardants, but water immiscible hydrocarbons generally, such for example as methylene chloride, chlorinated hydrocarbons of the ethylene group, carbon tetrachloride, etc., may be used. It is advantageous to use a retardant which will boil, or which at least will volatilize, at a temperature below the critical water swelling temperature of starch, which will vary with different starches but in general is about 60° C., to minimize or avoid danger of gelatinizing the starch. It is also advantageous to employ saturated hydrocarbons, in order to conserve the oxidizing chemical which is subsequently applied.

Preferred water immiscible retardants are volatile, removable from the starch and recoverable and, by their volatilization, aid in keeping the temperature down and making possible the rapid addition of the oxidizing agent. In addition, by initially retarding the wetting action of the oxidizing solution pending its distribution through the mass, they tend to cause full and prompt or essentially simultaneous oxidizing action as distinguished from the progressive oxidation which necessarily attends any slow or gradual adding of the oxidant.

The starch may be in the form of a finely divided mass of starchy material and the water immiscible or oily retardant may be added thereto, for example, by spraying or in any other way. Rapid agitation or mixing of the starchy mass is advantageous at this point, in order to facilitate distribution of the retardant throughout the mass.

Retardants of the general class above described may be added in different proportions according to the amount of retardation desired. In some instances the retardant may advantageously be added in amount substantially equal to the volume of the oxidizing solution.

Another treatment, which results in rendering particles of the starchy material water-repellent, comprises forming a water-repellent film in situ on such particles. For example, to a well-wetted mass or to a water suspension of starchy material there may be added a measured quantity of a soap solution such as, for example, sodium or potassium or ammonium resinate, or oleate, or stearate, and then, while effectively stirring, there may be added a measured quantity of an acid or a solution of an acid salt such as, for example, dilute sulfuric acid or aluminum acetate or aluminum sulfate, etc. As a result, there is deposited on the starchy particles an insoluble and, when dry, a water-repellent film.

This treated starch product may then be dried and powdered and treated with an aqueous oxidizing agent in the manner indicated below. The decreased or retarded wettability so obtained permits the addition of the oxidizing agent quickly and in a substantially more concentrated state than would be possible without the retardation of the wetting of the starchy material. Aqueous solutions of oxidizing agents such as, for example, sodium hypochlorite, carry as a stabilizer from 0.66 to 2% free caustic soda and this free caustic soda will, by virtue of its alkalinity, re-establish the wettability of the starchy material and permit the oxidation thereof. The explanation appears to be that the water resistance of precipitated free fatty acids or the metallic soaps of the free fatty acids exists only when the surrounding environment is on the acid side of neutral and that when the surrounding medium is made neutral to alkaline, water resistance is destroyed and wettability re-established.

Suitable oxidizing agents for use in my process include those employed in prior art methods such as the various hypochlorites, perborates, peroxides, permanganates and other oxidizing chemicals, which in general are readily soluble in water. After the retardant has been added to the starch and distributed therethrough, or the starch particles have been otherwise rendered measurably water-repellent, the oxidizing agent may be added. The addition of the oxidizing agent may be accomplished in various ways, as by spraying an aqueous solution thereof into a mass of starchy material suspended in a gaseous medium, as disclosed in my prior Patent No. 2,204,615, by spraying onto or into the starchy mass, or even by pouring the liquid into the mass. Vigorous agitation of the mass at the time of adding the oxidizing agent is highly desirable.

Although the invention is not limited to any particular theory of operation, it is believed that the water immiscible or water-repellent retardant coats the surfaces of constituent starchy granules of the mass with a thin film, thus bringing about, at least temporarily, a measurably water-repellent condition of the granules. While the granules are in this relatively non-wettable state, the oxidizing chemical, in the form of an aqueous liquid, can be added rapidly, without causing local gelatinization of the starchy mass. The rapid stirring permits every granule, protected by the retardant, to receive its prescribed quantity of oxidizing chemical. The coating of retardant is believed to protect the individual starch particles for a suitable period from the action of the oxidizing agent, but after the oxidizing agent is added and distributed through the mass, the retardant is volatilized or otherwise removed or modified, thus exposing the surfaces of the starch granules to the action of the oxidizing agent.

Oxidation of starch generates heat, which presents danger of breaking down the oxidizing agent into undesirable hypochlorous acid or free chlorine. The retardant should therefore be present in amount sufficient to prevent this or else the agitation should be sufficiently vigorous to dissipate the heat of oxidation.

Whereas by prior art methods it has been practical to use only, for example, sodium hypochlorite or calcium hypochlorite solutions of a strength of 6% or less available free chlorine, with my process it is possible to use solutions containing fully twice as much active oxidizing chemical.

Minimizing the amount of water carried by the oxidant makes possible the production of new conversion products, and has the further advantage of minimizing the formation of undesirable by-products.

In my process the conversion of the starch can be accomplished very rapidly and in fact the entire conversion can be effected in thirty minutes or less.

The speed and extent of the oxidation reaction may be varied by variation in the amount of retardant used, larger amounts tending to slow down or minimize the oxidation. The rate of conversion may further be controlled by variation in the strength of the oxidizing solution.

The treatment may be carried out either as a batch process or as a continuous process in which dry, finely divided starchy material can enter a reaction chamber continuously and, with the oxidation conversion completed, be delivered continuously from the converting equipment. The conversion can be carried out in a closed system at atmospheric pressure or under vacuum. The use of a vacuum facilitates volatilization of the retardant, which may be recovered if desired.

After the conversion has been effected, the converted starch can be further dried and shipped. Or it can be submerged in water or other liquid for further change, such for example as washing out by-products, changing the pH or adding other substances, as for example if the oxidized product is intended for use in making dextrine. The treated converted product can be further modified in various ways to fit it for varying industrial uses, for example the sizing of textile yarns or fabrics, the sizing of paper, use as an adhesive, etc.

It will thus be seen that I have provided an improved process for the production of an oxidized starch conversion product in which control of the oxidation is greatly facilitated, the reaction may be completed in a much shorter time than in processes now available, the process is readily carried out and a superior product may be obtained.

I claim:

1. In a method for making an oxidized starch conversion product, the steps which comprise treating a mass of starchy material to coat constituent particles thereof with a water immiscible retardant to oxidation, then adding to said material an oxidizing agent in the form of an aqueous liquid, said water immiscible coating initially inhibiting reaction of said oxidizing agent with the starch, and removing said coating to expose the starch to the action of the oxidizing agent.

2. That improvement in methods of making an oxidized starch conversion product which includes the steps of treating a finely divided mass of starchy material by adding thereto a water-immiscible retardant to oxidation in order to impart to said material water-repellent properties, then, while agitating the material, adding thereto an oxidizing agent, and permitting volatilization of the water-immiscible retardant to expose the starchy material to the action of the oxidizing agent.

3. In a method for making soluble starch, the steps which comprise adding to a mass of finely divided starchy material a water immiscible saturated hydrocarbon having a boiling point below the critical water swelling temperature of the starchy material, distributing said hydrocarbon through said mass, then adding thereto an oxidizing agent in the form of an aqueous liquid, while agitating the mass, then volatilizing said hydrocarbon to expose said starchy material to the action of the oxidizing agent.

4. That improvement in methods of making an oxidized starch conversion product which includes the steps of adding to a mass of starchy material a water-repellent hydrocarbon boiling below 60° C., agitating the mass to distribute said hydrocarbon therethrough, then while further agitating said starchy material, adding an oxidizing agent in the form of an aqueous solution, and then volatilizing said hydrocarbon to expose said starchy material to the action of the oxidizing agent.

5. In a method for making soluble starch, the steps which comprise coating constituent particles of a mass of starchy material with an oily, water immiscible substance, then adding to said mass an oxidizing agent, vigorously agitating the mass and volatilizing said oily substance, thus exposing the starch to the action of the oxidizing agent.

6. In a method for making an oxidized starch conversion product, the steps which comprise adding to a mass of starchy material a water-repellent retardant to oxidation of said material, distributing said repellent through said mass, then adding an oxidizing agent while agitating the mass, said water repellent retardant initially inhibiting reaction of said oxidizing agent with the starch, and thereafter terminating the reaction inhibiting function of said retardant to expose the starch to the action of the oxidizing agent.

7. That improvement in methods of making an oxidized starch conversion product which comprises spraying a water immiscible hydrocarbon having a boiling point below 60° C. into a finely divided mass of starchy material, distributing said hydrocarbon throughout said mass, then, while agitating said mass, adding an oxidizing agent thereto, and then volatilizing said hydrocarbon to expose said starchy material to the action of the oxidizing agent.

8. In a method for making an oxidized starch conversion product, the steps which comprise adding to a finely divided mass of starchy material a water-repellent hydrocarbon having a boiling point below the critical water swelling temperature of the starchy material, distributing said hydrocarbon through the mass, then, while agitating the mass, adding thereto an aqueous solution of an oxidizing agent, then volatilizing said hydrocarbon under sub-atmospheric pressure, to expose said starchy material to the action of the oxidizing agent.

9. The process for making soluble starch which comprises adding to a finely divided mass of starchy material a water immiscible petroleum ether having a boiling point below the critical water swelling temperature of the starch, agitating said starchy material to distribute said ether throughout the material and to coat constituent particles, adding an oxidizing agent in the form of an aqueous solution, while agitating the mass, volatilizing said petroleum ether to expose constituent particles of the starchy material to the action of the oxidizing agent and permitting oxidation thereof until a water soluble starch product is obtained.

10. That improvement in methods of making an oxidized starch conversion product which comprises forming in situ within and throughout a mass of starchy material and on individual particles thereof a water insoluble film, drying said starchy material, then adding thereto an oxidizing agent and agitating the mass, said water insoluble film initially inhibiting reaction of said oxidizing agent with the starch, and thereafter terminating the reaction inhibiting function of the film to expose the starch to the action of the oxidizing agent and permit formation of an oxidized water-soluble starch product.

11. That improvement in methods of making an oxidized starch conversion product which comprises treating a finely divided starchy material successively with a soap and with an acidic material, thus forming a water-insoluble deposit on said material, and subsequently treating the material with an aqueous oxidizing agent, containing an alkaline stabilizer, said water-insoluble deposit initially inhibiting reaction of said oxidizing agent with the starch, said alkaline stabilizer subsequently reestablishing the wettability of the starch to permit oxidation thereof to form a water-soluble starch.

12. In a method for making soluble starch, the steps which comprise suspending finely divided starchy material in an aqueous suspending medium, adding to such suspension a soap and an acidic material, then drying the starchy material and subsequently adding thereto an oxidizing agent in the form of an aqueous solution containing an alkaline stabilizer, said soap and said acidic material initially inhibiting reaction of said oxidizing agent with the starch, said alkaline stabilizer subsequently reestablishing the wettability of the starch to expose the starch to the action of the oxidizing agent and permit formation of an oxidized water-soluble product.

WALTER A. NIVLING.